United States Patent
Thomas et al.

(10) Patent No.: US 8,005,021 B2
(45) Date of Patent: Aug. 23, 2011

(54) METHOD AND DEVICE FOR ADDRESS ALLOCATION FOR TRANSMITTING PACKETS OVER A TRANSPARENT BRIDGE

(75) Inventors: Nathalie Thomas, Chantepie (FR);
Gilles Straub, Acigne (FR); Sébastien Perrot, Rennes (FR)

(73) Assignee: Thomson Licensing, Boulogne Billancourt (FR)

( * ) Notice: Subject to any disclaimer, the term of this patent is extended or adjusted under 35 U.S.C. 154(b) by 1179 days.

(21) Appl. No.: 10/495,884

(22) PCT Filed: Nov. 8, 2002

(86) PCT No.: PCT/EP02/10652
§ 371 (c)(1),
(2), (4) Date: May 18, 2004

(87) PCT Pub. No.: WO03/045014
PCT Pub. Date: May 30, 2003

(65) Prior Publication Data
US 2004/0258071 A1 Dec. 23, 2004

(30) Foreign Application Priority Data
Nov. 19, 2001 (EP) .................................. 01402957

(51) Int. Cl.
*H04L 12/28* (2006.01)
(52) U.S. Cl. ................... 370/257; 370/285; 709/221
(58) Field of Classification Search ............... 370/395.4, 370/401, 254
See application file for complete search history.

(56) References Cited

U.S. PATENT DOCUMENTS

| | | | | |
|---|---|---|---|---|
| 5,857,083 | A * | 1/1999 | Venkat | 710/314 |
| 6,286,067 | B1 | 9/2001 | James et al. | 710/104 |
| 6,954,429 | B2 * | 10/2005 | Horton et al. | 370/230.1 |
| 7,020,076 | B1 * | 3/2006 | Alkalai et al. | 370/217 |
| 2002/0174168 | A1 * | 11/2002 | Beukema et al. | 709/201 |
| 2004/0157596 | A1 * | 8/2004 | Perrot et al. | 455/426.1 |

OTHER PUBLICATIONS

IEEE Standard 1394-1995m "IEEE Standard for a high performance Serial Bus", Approved Dec. 12, 1995, p. 46-123.*

(Continued)

*Primary Examiner* — Jianye Wu
(74) *Attorney, Agent, or Firm* — Robert D. Shedd; Paul P. Kiel

(57) ABSTRACT

The invention concerns a method for transmitting packets in a network comprising at least a first sub-network and a second sub-network connected through a transparent communication link, said link comprising at least a first interface device connected to the first sub-network and a second interface device connected to the second sub-network. The method comprises the steps of:
 attributing a first set of addresses to the interface devices on the communication link;
 attributing a second set of addresses to nodes connected to the sub-networks, the attribution of the second set being done independently from the attribution of the first set;
 checking whether there appears a conflict between an address of the first set and an address of the second set, and in the affirmative:
 changing the conflicting address of the first set to a non conflicting address.

The invention also concerns a device for implementing the method as well as a method for detecting and transmitting packets to be transmitted over the link.

8 Claims, 4 Drawing Sheets

OTHER PUBLICATIONS

ETSI: "Broadband Radio Access Networks (BRAN); HIPERLAN Type 2; Packet based convergence layer; Part 3: IEEE 1394 Service Specific Convergence Sublayer (SSCS)" ETSI TS 101 493-3 V1.1.1, Sep. 2000, paragraph '04.1'-paragraph 04.2!; fig. 3, p. 27, paragraph 6.1—p. 32, paragraph 6.4.3, pp. 1-74.

D.V. James: Hiperlan-2 wireless informative annex as submitted to the p1394.1 committee, Oct. 12, 1999, pp. 1-12.

J.K. Jush et al: "ETSI Project BRAN: HiperLAN Type 11 for IEEE 1394 Applns: System Overview", Oct. 14, 1999, pp. 1-18.

ETSI: "Broadband Radio Access Networks (BRAN); HIPERLAN Type 2; Packet based Convergence Layer; part 4: IEEE 1394 Bridge Specific Functions sub-layer for restricted topology" ETSI TS 101 493-4 V1.1.1, Jul. 2001, pp. 1-29.

David James: "Maintaining integrity by assigning new busIDs on each bus reset as submitted to the p1394.1 committee" P1394.1 Commmittee, Oct. 12, 1999, pp. 1-20.

IEEE: "IEEE Standard for a High Performance Serial Bus-1394-1395" IEEE Computer Science, pp. 234-241.

IEEE: "IEEE Standard for a High Performance Serial Bus—Amendment 1-1394a-2000", IEEE Computer Science, pp. 103-104.

Search Report dated Apr. 23, 2003.

* cited by examiner

METHOD AND DEVICE FOR ADDRESS ALLOCATION FOR TRANSMITTING PACKETS OVER A TRANSPARENT BRIDGE

This application claims the benefit, under 35 U.S.C. §365 of International Application PCT/EP02/10652, filed Nov. 8, 2002, which was published in accordance with PCT Article 21(2) on May 30, 2003 in English and which claims the benefit of European patent application No. 01402957.3, filed Nov. 19, 2001.

The invention concerns a method and a device to transmit packets, in particular PHY layer packets, over a transparent bridge. It can be applied in particular to the transmission of IEEE 1394 link-on packets from one IEEE 1394 bus to another.

The aim of a transparent bridge linking sub-networks is to enable a node on any sub-network to communicate with another node on any sub-network without requiring specific software to cross the bridge. As far as the node is concerned, the bridge is 'transparent' in the sense that the node does not need to be aware of the bridge's presence—or require specific software to address it—in order to communicate with any other node. The node is referred to as being "non-bridge aware". When a transparent bridge connects two IEEE 1394 busses, the network thus formed basically functions as though there was a single IEEE 1394 bus. For example, physical identifiers, which are non-permanent identifiers attributed to nodes after a bus reset, are attributed as if all nodes were connected to a single bus. This is to be opposed to what happens on a network comprising busses linked by non-transparent bridges, where physical identifiers are attributed separately on each bus, and nodes are distinguished on the network through their physical identifier to which a bus identifier is added.

One implementation of a transparent bridge is described for example in the European patent application 01400826.2 having the title "Method for linking communication busses using wireless links" filed in the name of Thomson Licensing SA on Mar. 30, 2001.

According to the IEEE 1394 standard, several types of packets are used at the level of the physical layer. For example, Self-ID packets are used after a bus reset among other things to set up physical identifiers. Physical configuration packets are used among other things to force a node to become 'root node' on its bus. Link-on packets are used to instruct the physical layer of another node located on the same bus to wake up its link layer.

It is desirable to be able to transmit link-on packets over the transparent bridge in order to allow a node to wake up another node located on a remote subnetwork According to the ETSI BRAN IEEE 1394 Service Specific Convergence Layer Technical Specification, physical identifiers are attributed by a central controller of the wireless network to each wireless device at the time of association. When transmitting asynchronous packets between wireless devices, a specific protocol data unit (PDU) is used. This PDU comprises an asynchronous subaction message as defined by the IEEE 1394 standard. The subaction itself comprises the source node identifier and the destination node identifier.

While in the case of a non-transparent bridge, the source and destination identifiers comprise the bus identifiers to differentiate nodes on each bus, this is not so when the bridge is transparent, since a single bus is simulated. In this case, conflicts between physical identifiers of wireless devices on the bridge's switching fabric network and the physical identifiers on the wired busses connected through the bridge may appear. Indeed, there is no parameter in a SSCS PDU allowing to distinguish between a Hiperlan 2 transaction layer message—between two wireless devices on the 'wireless' bus—and a IEEE 1394 transaction layer message—between two IEEE 1394 nodes, the two wireless devices transmitting this message.

An object of the invention is a method for transmitting packets in a network comprising at least a first sub-network and a second sub-network connected through a transparent communication link, said link comprising at least a first interface device connected to the first sub-network and a second interface device connected to the second sub-network said method comprising the steps of:

attributing a first set of addresses to the interface devices on the communication link;

attributing a second set of addresses to nodes connected to the sub-networks, the attribution of the second set being done independently from the attribution of the first set;

checking whether there appears a conflict between an address of the first set and an address of the second set, and in the affirmative:

changing the conflicting address of the first set to a non conflicting address.

By checking possible address conflicts at the appropriate moment and correcting the addresses concerned, a conflict during transmission of certain messages over the communication link can be avoided.

According to an embodiment of the invention, the interface devices having an address of the first set for their side on the communication link and an address of the second set for their side connected to a sub-network, a conflict appears when an address of the first set is equal to an address of the second set.

According to a variant embodiment of the invention, the interface devices having an address of the first set for their side on the communication link and an address of the second set for their side connected to a sub-network, a conflict appears when an address of the first set is equal to an address of the second set, except when the two addresses assigned to an interface device are equal.

According to an embodiment of the invention, the step of changing the conflicting address comprises the step of having the interface device request a new address until a non-conflicting address is obtained.

According to an embodiment of the invention, the request comprises the step of having the interface device generate a reset of the communication link to launch a new process of attribution of addresses of the first set.

According to an embodiment of the invention, the interface device generating the reset specifies whether it wishes attribution of a new address compared to its address before the reset, or whether it wants to keep the address it had before the reset.

According to an embodiment of the invention, the changing of a conflicting address by an interface device comprises the step for the interface device to request a specific non-conflicting address on the communication link.

According to an embodiment of the invention, the communication link is a Hiperlan 2 wireless network, the sub-networks are IEEE 1394 busses and the first and second set of addresses are physical addresses.

According to an embodiment of the invention, the method further comprises the steps of:

for an interface device, detecting a link-on packet on its local bus;

checking whether a physical destination address in the link-on packet corresponds to a node on a remote bus;

transmitting at least the physical address of said node to another interface device connected to the bus of said node;

for the latter interface device, transmitting a link-on message to said node on its local bus.

According to an embodiment of the invention, an interface device comprises a register, said register being accessible by other interface devices on the wireless network for writing a physical address of a node for which a link-on packet was detected on one of the sub-networks, and wherein the writing to the register of a given interface device triggers transmission of a link-on packet on the given interface device's local sub-network.

According to an embodiment of the invention, the step of checking whether a physical destination address in the link-on packet corresponds to a node on a remote sub-network uses a look-up table indicating the physical address of an interface device on the communication link as a function of the physical addresses of the nodes of the local sub-network to which said interface device is connected.

Another object of the interface device for interfacing a first sub-network with a transparent communication link, wherein devices connected to the communication link are given addresses from a first set, and wherein nodes connected to sub-networks connected to the communication link are given addresses from a second set, independently from the attribution of the addresses of the first set, said interface device comprising means for checking whether there appears a conflict between an address of the first set and an address of the second set, and means for triggering a change of the conflicting address of the first set to a non conflicting address.

Another object of the invention is a method for transmitting packets in a network comprising at least a first sub-network and a second sub-network connected through a transparent communication link, said link comprising at least a first interface device connected to the first sub-network and a second interface device connected to the second sub-network, said method comprising the steps of:

for an interface device, detecting a link-on packet on its local sub-network;

checking whether a physical destination address in the link-on packet corresponds to a node on a remote sub-network;

transmitting at least the physical address of said node to another interface device connected to the sub-network of said node;

for the latter interface device, transmitting a link-on message to said node on its local sub-network.

The method advantageously transmits messages, such as link-on messages, only when necessary.

Other characteristics and advantages of the invention will appear through the description of a non-restrictive embodiment of the invention, explained with the help of the enclosed figures, integral part of the description and among which:

The present embodiment concerns a network formed by two IEEE 1394 wired busses, connected through a transparent bridge based on the ETSI BRAN Hiperlan 2 radio network.

More information concerning IEEE 1394 can be found in the documents IEEE 1394-1995 and IEEE 1394a-2000 as well as in its different improvements and additions available from the IEEE. Broadband Access Radio Networks (BRAN) Hiperlan 2 is described by a series of documents edited by the European Telecommunications Standards Institute. The most relevant documents concerning the present invention are the documents ETSI TS 101 493-1 Packet Based Convergence Layer: Part 1 Common Part version 1.1.1 of April 2000 and ETSI TS 101 493-3 Packet Based Convergence Layer: IEEE 1394 Service Specific Convergence Sublayer (SSCS), v 1.2.1B (October 2001).

Concerning the behavior of the wireless boxes constituting the transparent link, reference is made to the patent application mentioned in the introduction.

It is to be noted that although the present embodiment is placed in the context above, the invention is not limited to this context. For example, a sub-network comprising itself several busses and transparent bridges can replace the IEEE 1394 busses. Moreover, the bridge may link more than two busses or sub-networks ('multipoint bridge'). Many aspects of the invention could be used in environments other than the IEEE 1394 or Hiperlan 2 environments.

Figure 1:
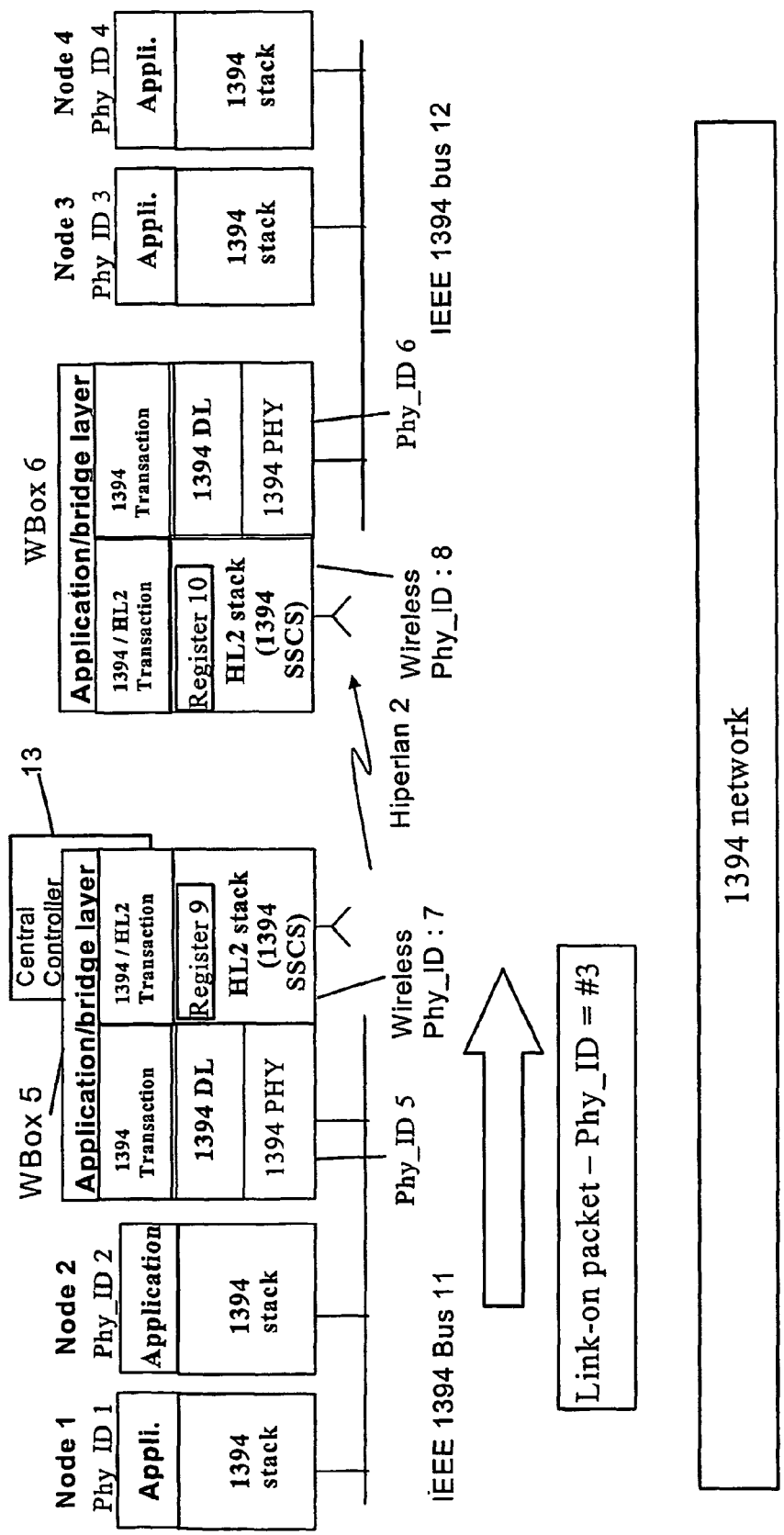
FIG. 1 is a diagram of a network after a change of physical identifiers on the bridge according to the present embodiment.

FIG. 1 is a block diagram of a network comprising two IEEE 1394 busses 11 and 12, linked through a transparent bridge comprising two wireless boxes 5 and 6. Each wireless box implements an IEEE 1394 stack (also called 'IEEE 1394 controller') on its wired bus interface and a Hiperlan 2 stack on its wireless interface. Each wireless box also comprises a wireless box application, which enables the wireless boxes to render the bridge transparent. This application layer will also be called 'bridge layer' in what follows.

Each wireless box comprises memory, connectors and processing means such as a microprocessor or microcontroller, in order to store the data and programs and to carry out the method according to the present embodiment.

In particular, as described in the already mentioned patent application, each wireless box represents the nodes of the remote bus on its own local bus during bus reset, in order to have different physical identifiers for each node connected to one of the two IEEE 1394 busses. For convenience, nodes are numbered according to their physical identifiers on the wired busses, i.e. nodes 1 and 2 connected to bus 10 have physical identifiers 1 and 2, nodes 3 and 4 connected to bus 11 have physical identifiers 3 and 4 and wireless boxes 5 and 6, as nodes connected to the wired busses, have physical identifiers 5 and 6.

On the side of the Hiperlan network, during association, each wireless box is given a physical identifier (called 'wireless physical identifier' in what follows) by a central controller The central controller may be one of the wireless boxes, or another wired device. In FIG. 1, the wireless box 5 also acts as central controller 13.

According to the present embodiment, each wireless box has a routing table identifying, for each node of the network, the wireless box connected to the bus to which the node is itself connected. This table is derived from the Self-ID information transmitted among the wireless boxes after a network reset. It is used among other things to route asynchronous packets from one wireless box to the other, and in particular link-on packets.

In the routing table, an IEEE 1394 node is identified by its physical identifier on its wired bus, and a wireless box is identified by both its physical identifier on the wired bus and its physical identifier on the wireless network (the wireless physical identifier).

After a reset of the network, and once all IEEE 1394 nodes have their physical identifier, the wireless boxes check whether there is a conflict between their own wireless physical identifier and a physical identifier of one of the IEEE 1394 nodes.

According to the present embodiment, there is a conflict when the wireless physical identifier of a wireless box is equal to the physical identifier of an IEEE 1394 node. Note that for this purpose, the wireless boxes' 1394 controller sections are also considered as IEEE 1394 nodes.

In case a wireless box detects that its wireless physical identifier is equal to a IEEE 1394 physical identifier, it requests a 'Hiperlan 2 bus' reset with the central controller through its SSCS layer. To achieve this, a primitive 'CL_Control' of the SSCS layer is called by the bridge layer. This primitive call comprises a parameter called 'physical_ID_change', allowing a wireless box to request a new physical identifier on the wireless network. This primitive is described in section 6.2.1 of the SSCS document mentioned earlier. The SSCS layer then sends a request primitive called 'DLC_INFO_TRANSFER' to the central controller. This request primitive contains an information element called 'BUS_RESET', which triggers the bus reset at the level of the central controller. The information as to whether a new physical identifier is requested or not by the wireless device sending the request is indicated by a flag called 'new_phy_ID'.

Unless the 'physical_ID_change' parameter is set in the CL_Control primitive, the central controller assigns to a wireless box the same identifier it had before the reset request, i.e. once a wireless box has acquired a physical identifier, it will be able to carry it over the next reset, unless it requests a new one. The central controller uses in priority physical identifiers which were not previously assigned. Recycled physical identifiers are used only when no new physical identifiers are available.

A wireless box repeats its reset requests until it obtains a wireless physical identifier that is not in conflict with an IEEE 1394 physical identifier. This is achieved sooner or later, if the number of nodes on the network is lower than the authorized maximum, i.e. there are enough physical identifiers available for the wireless boxes to obtain unique ones.

In the case of FIG. 1, the wireless physical identifiers of wireless boxes 5 and 6 may for example be 7 and 8.

Figure 2:
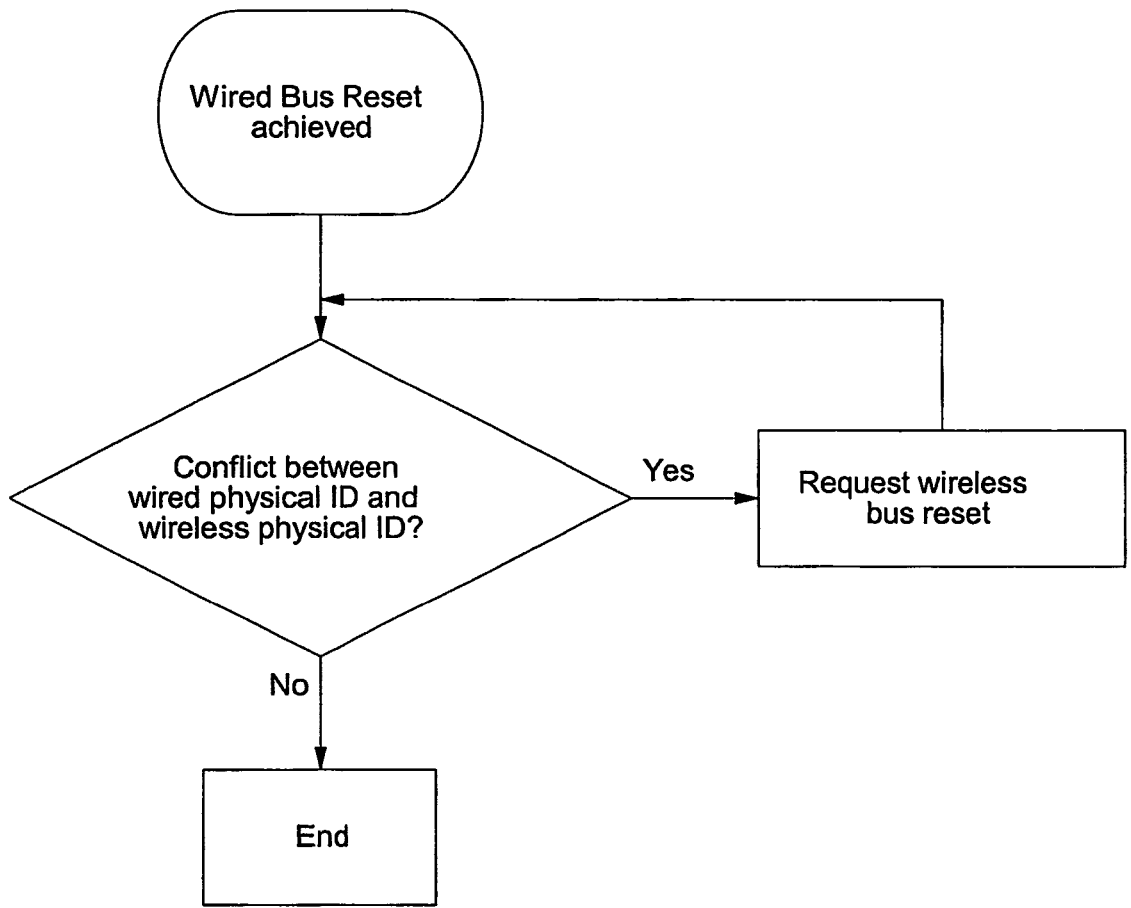
FIG. 2 is a flowchart of the method according to the present embodiment to correct conflicts between physical identifiers on different parts of the network.

The general process is illustrated by the flowchart of FIG. 2.

Figure 3:
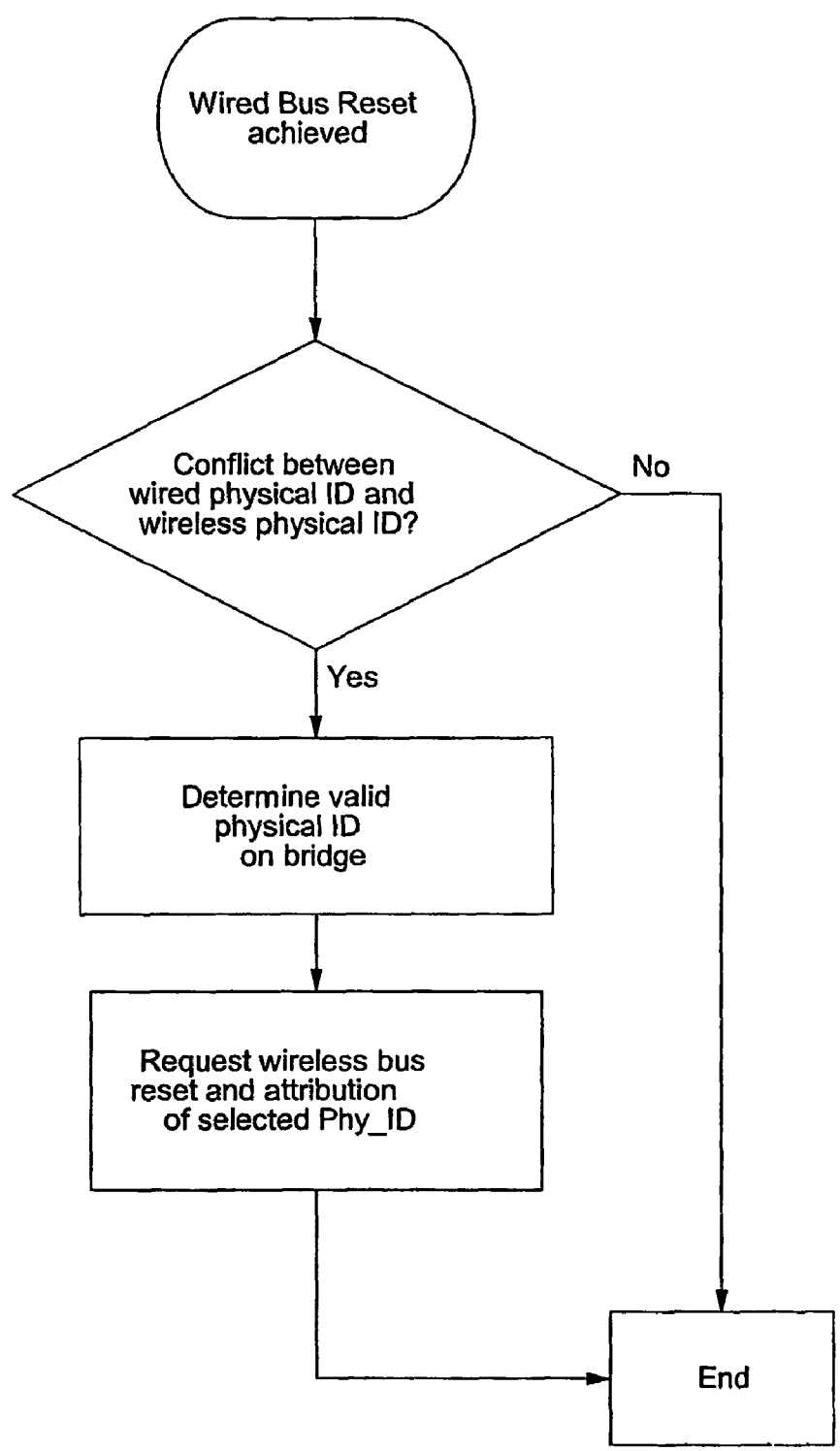
FIG. 3 is a flowchart of a variant of the method of FIG. 2.

According to a variant embodiment illustrated with the help of the flowchart of FIG. 3, a wireless box specifies which physical identifier it wishes to receive during the reset of the wireless bus. According to this variant embodiment, a new parameter is added to the CL_Control primitive. This parameter is called 'new_physical_ID', and represents the value of the requested physical identifier. A similar parameter is added in the "BUS_RESET" information element to pass this data on to the central controller. A requesting node knows which physical identifiers are used on the IEEE 1394 busses and which ones are used on the wireless link, and it chooses a proper value accordingly. This implementation requires a modification of the SSCS technical specification mentioned above.

Other implementations for requesting a specific physical identifier may also be contemplated by the Man skilled in the Art.

This variant embodiment has the advantage of requiring at maximum one reset of the wireless bus per wireless box.

According to the variant above, the wireless boxes may not be assigned, on the wireless bus, a physical identifier that is already in use on the IEEE 1394 busses. This restriction may be partially lifted in that wireless boxes may have identical physical identifiers on both the wired bus and the wireless link. This possibility is interesting because acceptable wireless physical identifiers will then always be available, even if the number of IEEE 1394 nodes reaches the authorized maximum, but it supposes that a wireless box may request a specific wireless physical address. If a given wireless physical address is already taken, the wireless box requesting the wireless physical address has to select another address. It is also possible for a central controller to allow a wireless box to obtain any specific wireless physical address, even if it has already been attributed to another wireless box, unless it is not equal to the physical identifier of the requesting wireless box.

Figure 4:
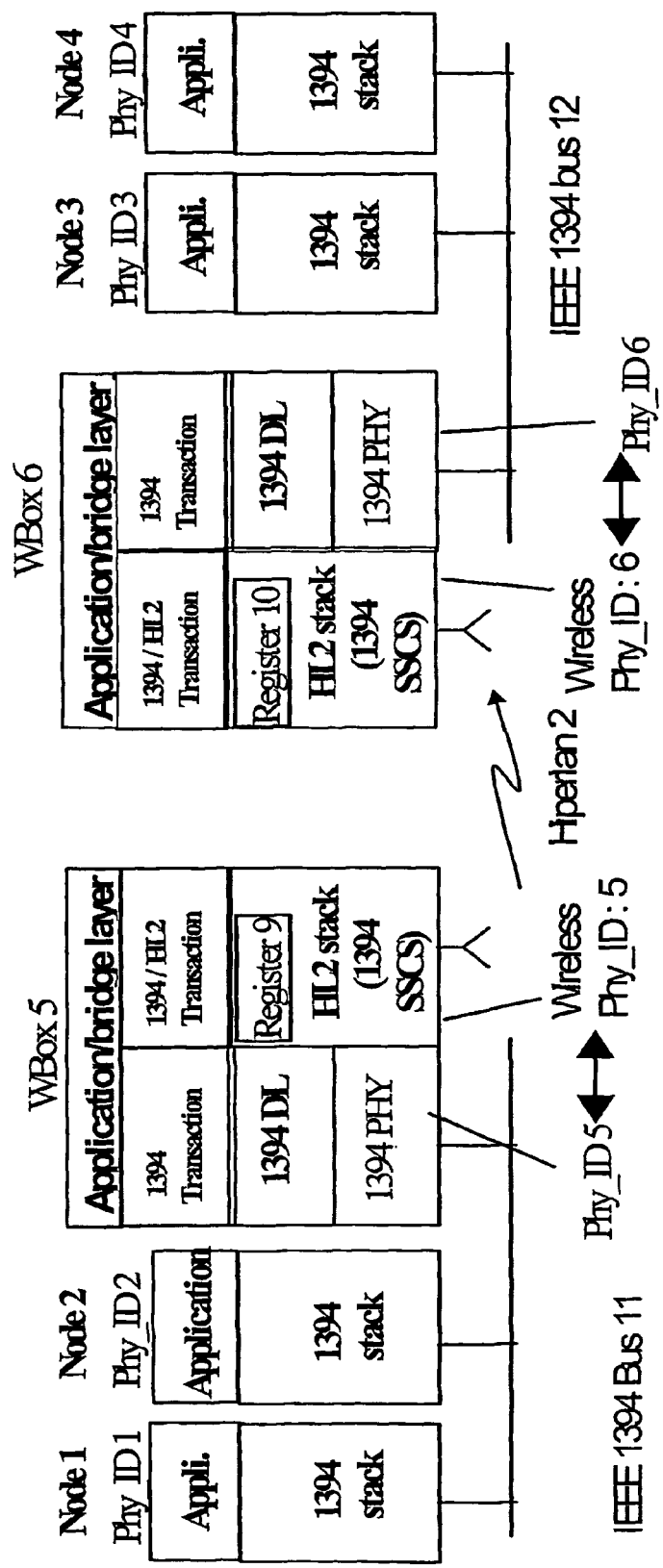
FIG. 4 is a diagram of the network of FIG. 1 according to a variant embodiment.

FIG. 4 is a diagram representing the network of FIG. 1, but in which physical identifiers have been attributed on the wireless link according to the variant embodiment which has just been described.

Note that the main embodiment and its variant are not exclusive of each other: Some wireless boxes may function according to the main embodiment, some according to the variant.

The process of transmitting a link-on packet from a source node (e.g. node 1) to a destination node (e.g. node 3) will now be described.

The first case to be described concerns the general case when the wireless physical identifiers of the wireless boxes are different from any of the IEEE 1394 physical identifiers.

For receiving information relating to a link-on packet destined to its local bus, each wireless box according to the present embodiment comprises a register called 'LINK_ON register'. According to the present embodiment, the LINK_ON register has the format given by table 1:

TABLE 1

| Physical_ID (6) | Reserved (18) |
|---|---|

The registers of wireless boxes 5 and 6 in FIGS. 1 and 4 are referenced respectively 9 and 10.

A protocol data unit (PDU) of the ETSI BRAN Packet based convergence layer, part 3, IEEE 1394 Service Specific Convergence Sublayer (SSCS) is used to write to the LINK_ON register of a wireless box. This SSCS PDU comprises, in addition to a format field, a time of death field and an asynchronous subaction type field, the asynchronous subaction itself. This subaction comprises a destination node address and a source node address. Each address is composed of a 10 bit bus identifier and of a 6 bit node identifier, the latter being the physical identifier attributed during the latest bus reset.

According to the present embodiment, the 10 bit bus identifier is not used by the bridge to distinguish the origin or destination bus (including the wireless link) of a SSCS PDU, in order to maintain compatibility with non-transparent bridges which could be connected to the network. Only the 6-bit physical identifier field is used, as detailed below. Since the bridge of FIG. 1 is transparent, the network constituted by the two IEEE 1394 busses and the transparent bridge forms a single logical bus.

A wireless box, e.g. wireless box 5, listens to the link-on packets appearing on its local bus. The following process is carried out:

(1) The physical layer of wireless box 5 detects a link-on packet on its local bus. A corresponding message is sent from the physical layer to the bridge layer.

(2) Using the routing table, the bridge layer checks whether the destination address in the link-on packet corresponds to a node present on a remote bus.

(3) In the affirmative, the bridge layer of wireless box 5 constructs a write data quadlet transaction subaction packet, which is an asynchronous transaction packet. The subaction packet contains a known offset of the LINK_ON register in the other wireless box memory—the offset being the same for all wireless boxes. It also contains, in its quadlet data field, the link_on packet which comprises the physical identifier of the node whose link layer is to be activated.

(4) The bridge layer of the wireless box 5 posts the packet with the SSCS layer.

(5) The SSCS layer of wireless box 5 retrieves the wireless physical identifier of the wireless box 6 from its routing table (using the wired physical identifier of the node to be activated as an index), and uses it as destination address in the SSCS PDU. The SSCS layer of wireless box 5 transmits this packet to the SSCS layer of wireless box 6.

(6) The SSCS layer of wireless box 6 extracts the write request from the SSCS PDU and transmits it to the bridge layer of wireless box 6. The bridge layer identifies, through the destination_ID of the write request, whether this write request is destined to its wireless part, or to a node on its local bus (including its wired part). In case the bridge layer detects its own unique wireless physical identifier, it analyzes the content of the write request and writes the content of the quadlet_data field to the LINK_ON register.

(7) The writing to the register prompts the bridge layer of wireless box 6 to send an order to the physical layer to generate a link-on packet using the physical identifier present in the LINK_ON register.

According to a variant embodiment, step 2 is carried out by the physical layer of the wireless node controller.

The second case to be described concerns the variant embodiment in which a wireless box possesses a wireless physical identifier equal to its wired physical identifier. Whether the identifiers are equal is a fact known to each wireless box.

Compared to the first case: when the bridge layer of a wireless box receives a write request for data quadlet from its SSCS layer, the bridge layer checks the destination identifier field of the asynchronous transaction. If the physical identifier in the destination identifier field is different from the wireless physical identifier of the wireless box, then the bridge layer knows that this write request is destined to a node on the wired bus, and behaves as in the first case. If the physical identifiers are equal, the bridge layer needs to determine if the subaction is destined to the wireless node's IEEE 1394 node controller or to its wired node controller. To achieve this, the bridge layer verifies the source identifier of the write request. If this source identifier is that of another wireless box, then the bridge layer supposes that the write request is addressed to the wireless node controller of the wireless box. On the other hand, if the source identifier is that of an IEEE 1394 node, then the bridge layer supposes that the write request is addressed to the IEEE 1394 node controller of the wireless box. With this method, a wireless box cannot distinguish between the IEEE 1394 node controller and the Hiperlan transaction layer of another wireless box. Similarly, a node from the wired bus cannot see the Hiperlan 2 node controller as an independent node.

Note that a wireless box need not necessarily be an IEEE 1394 node, and may not have an IEEE 1394 physical identifier on the wired bus to which it is connected.

Although according to the embodiment which has been described, the transmission of the link-on packet over the wireless link is carried out by writing a physical address into a register of a wireless box, this transmission can be carried out in other ways, as long as the wireless box connected to the bus comprising the link-on destination node receives at least the physical address of this destination node.

The invention claimed is:

1. Method for transmitting packets in a network comprising at least a first sub-network and a second sub-network connected through a transparent communication link, said link comprising at least a first interface device connected to the first sub-network and a second interface device connected to the second sub-network, said method comprising:
    attributing a first set of addresses to the interface devices on the communication link;
    attributing a second set of addresses to nodes connected to the sub-networks, the attribution of the second set being done independently from the attribution of the first set;
    checking by at least one of said interface devices whether there appears a conflict between an address of the first set and an address of the second set, and in the affirmative:
    requesting a determined non-conflicting address on the communication link by at least one of said interface devices said determined non-conflicting address being requested during a reset of the communication link to launch a new process of attribution of addresses of the first set;
    changing the conflicting address of the first set to the determined non conflicting address.

2. Method according to claim 1, wherein, the interface devices having an address of the first set for their side on the communication link and an address of the second set for their side connected to a sub-network, a conflict appears when an address of the first set is equal to an address of the second set.

3. Method according to claim 1, wherein, the interface devices having an address of the first set for their side on the communication link and an address of the second set for their side connected to a sub-network, a conflict appears when an address of the first set is equal to an address of the second set, except when the two addresses assigned to an interface device are equal.

4. Method according to claim 1, wherein the communication link is a Hiperlan 2 wireless network, the sub-networks are IEEE 1394 busses and the first and second set of addresses are physical addresses.

5. Method according to claim 4, further comprising:
    for a first interface device, detecting a link-on packet on its local sub-network;
    checking whether a physical destination address in the link-on packet corresponds to a node on a remote sub-network;
    transmitting at least the physical address of said node to a second interface device connected to the sub-network of said node;
    for the second interface device, transmitting a link-on message to said node on its local sub-network.

6. Method according to claim 5, wherein an interface device comprises a register, said register being accessible by other interface devices on the wireless network for writing a physical address of a node for which a link-on packet was detected on one of the sub-networks, and wherein the writing to the register of a given interface device triggers transmission of a link-on packet on the given interface device's local sub-network.

7. Method according to claim 5, wherein the checking whether a physical destination address in the link-on packet corresponds to a node on a remote sub-network uses a look-up table indicating the physical address of an interface device on the communication link as a function of the physical addresses of the nodes of the local sub-network to which said interface device is connected.

8. Interface device for interfacing a first sub-network with a transparent communication link, wherein devices connected to the communication link are given addresses from a first set, and wherein nodes connected to sub-networks connected to the communication link are given addresses from a second set, independently from the attribution of the addresses of the first set, said interface device comprising means for checking whether there appears a conflict between an address of the first set and an address of the second set, means for requesting a determined non-conflicting address during a reset of the communication link to launch a new process of attribution of addresses of the first set and means for triggering a change of the conflicting address of the first set to the determined non conflicting address.

* * * * *